(12) United States Patent
Muhlhoff et al.

(10) Patent No.: US 10,105,995 B2
(45) Date of Patent: Oct. 23, 2018

(54) TIRE COMPRISING A HIGH CONTRAST PATTERN COMPRISING A PLURALITY OF CAVITIES

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Olivier Muhlhoff, Clermont-Ferrand (FR); Jean-Claude Desvignes, Clermont-Ferrand (FR); Antoine Paturle, Clermont-Ferrand (FR)

(73) Assignees: Compagnie Generale Des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 248 days.

(21) Appl. No.: 14/427,416

(22) PCT Filed: Sep. 10, 2013

(86) PCT No.: PCT/EP2013/068666
§ 371 (c)(1),
(2) Date: Mar. 11, 2015

(87) PCT Pub. No.: WO2014/040967
PCT Pub. Date: Mar. 20, 2014

(65) Prior Publication Data
US 2015/0246587 A1  Sep. 3, 2015

(30) Foreign Application Priority Data

Sep. 12, 2012 (FR) ..................... 12 58550

(51) Int. Cl.
*B60C 13/00* (2006.01)
*B60C 13/02* (2006.01)
(Continued)

(52) U.S. Cl.
CPC .......... *B60C 13/001* (2013.01); *B23K 26/384* (2015.10); *B29D 30/0606* (2013.01); *B29D 2030/0612* (2013.01)

(58) Field of Classification Search
CPC ....... B60C 13/00; B60C 13/001; B60C 13/02; B60C 13/023; B60C 13/04
See application file for complete search history.

(56) References Cited

U.S. PATENT DOCUMENTS 5,263,525 A    11/1993   Yamashita
2012/0118466 A1  5/2012   Ebiko

FOREIGN PATENT DOCUMENTS

DE    102009043900    3/2011
DE    102010050077    5/2012
(Continued)

OTHER PUBLICATIONS

Machine translation of JP 2007-22367, 2007.*
(Continued)

*Primary Examiner* — Justin R Fischer
(74) *Attorney, Agent, or Firm* — Dickinson Wright PLLC

(57) ABSTRACT

A tire made of rubbery material comprising a sidewall and a pattern formed on this sidewall. This pattern comprises a plurality of openings and intermediate zones separating these openings. In order for the pattern to contrast with the sidewall, the openings occupy at least 60% of the pattern, these openings being distributed through the pattern at a density at least equal to five openings per square millimeter ($mm^2$), these openings having equivalent diameters of between 0.03 mm and 0.5 mm. A mold element for making (Continued)

the openings and and method of making the pattern using a laser.

5 Claims, 4 Drawing Sheets

(51) Int. Cl.
*B29D 30/06* (2006.01)
*B23K 26/384* (2014.01)

(56) References Cited

FOREIGN PATENT DOCUMENTS

| EP | 0522781 A1 | | 1/1993 |
|---|---|---|---|
| GB | 2381367 | * | 4/2003 |
| JP | 2003-246209 | * | 9/2003 |
| JP | 2007-22367 | * | 2/2007 |

OTHER PUBLICATIONS

Machine translation of JP 2003-246209, 2003.*
International Search Report for PCT/EP2013/068666 dated Oct. 31, 2013.

* cited by examiner

TIRE COMPRISING A HIGH CONTRAST PATTERN COMPRISING A PLURALITY OF CAVITIES

This application is a 371 national phase entry of PCT/EP2013/068666, filed 10 Sep. 2013, which claims benefit to French Patent Application No. 1258550, filed 12 Sep. 2012, the contents of which are incorporated herein by reference for all purposes.

BACKGROUND

1. Field

The present disclosure relates to a tire for a motor vehicle comprising a high contrast pattern comprising a plurality of cavities, it also relates to at least one method for producing such a pattern.

2. Description of Related Art

Tire sidewalls bear a large quantity of patterns intended firstly to provide technical and legal information and secondly to allow consumers to discern the origin of the product.

Attempts are constantly being made at improving the visibility and legibility of these patterns on tire sidewalls.

Document WO2007/045425 describes a high contrast pattern comprising a plurality of strands the cross section of which decreases from the base of each strand toward the tip of the said strand. The density of the strands in the pattern is at least equal to five strands per unit area of pattern expressed in square millimeters ($mm^2$).

The effect of these strands is to "trap" a large amount of incident light radiation falling on the pattern. This allows the pattern to be given a darker appearance by comparison with the rest of the sidewall of the tire. The strands also make it possible to obtain a particularly pleasant feel, of the "velour" type.

However, a pattern comprising such strands may be relatively fragile in the face of certain mechanical attacks, such as rubbing against a pavement. Under the effect of this rubbing, the strands of the pattern may become detached from the tire.

There is therefore a need to propose a high contrast pattern in which the contrast against a sidewall of the tire is more durable.

Definitions

A "tire" means any tire with resilient tread whether or not it is subjected to an internal pressure.

A "tread" of a tire means a quantity of rubbery material delimited by lateral surfaces and by two main surfaces one of which is intended to come into contact with a roadway when the tire is running.

A "bead" of a tire means part of the tire intended to be seated on a wheel rim.

A "sidewall" of a tire means a lateral surface of the tire which is positioned between the tread of the tire and a bead of this tire.

A "pattern" on a sidewall means a collection of openings and intermediate zones separating these openings. The openings are recessed into the sidewall and the intermediate zones are formed by rubbery material.

The "equivalent diameter" of an opening of a cavity or of a base of a protuberance respectively, means the diameter of the circle inscribed inside this opening or in this base, respectively.

A "mold" means a collection of separate mold elements which, when brought relatively close together, are able to delimit a torroidal molding space.

A "marking" in a mold means a plurality of protuberances projecting from this mold and intermediate parts of the mold separating these protuberances.

SUMMARY

The invention, in an embodiment, relates to a tire made of rubbery material comprising a sidewall and a pattern formed on this sidewall. The pattern comprises a plurality of openings and intermediate zones separating these openings. In order for the pattern to contrast with the sidewall, the openings occupy at least 60% of the pattern, these openings being distributed through the pattern at a density at least equal to five openings per square millimeter ($mm^2$), these openings having equivalent diameters of between 0.03 mm and 0.5 mm.

By virtue of the embodiments of the invention it is possible to create a pattern which exhibits contrast against the sidewall of the tire while at the same time being more durable. Specifically, because the pattern is made up of openings which are recessed into the sidewall, the impact on the pattern of rubbing against a pavement is small. The durability of the pattern on this sidewall is thus improved.

For preference, the openings occupy at least 70% of the pattern, at least 80% of the pattern, at least 90% of the pattern or at least 95% of the pattern.

The higher the proportion of openings in the pattern, the better the contrast of this pattern against the sidewall.

In one alternative form of embodiment, all or some of the openings are of polygonal shape.

In this way, it is possible more easily to organise the openings relative to one another in such a way as to limit the surface area of the intermediate zones between these openings. With such a shape of openings it is possible more easily to achieve high proportions of openings.

In an alternative form of embodiment, the openings extend into the depth of the sidewall to form cavities. All or some of these cavities have a cross section that decreases into the depth of the sidewall.

In this way, the ability of the pattern to absorb incident light radiation is improved.

In one preferred embodiment, all or some of the cavities have a depth of between 0.2 mm and 0.6 mm.

In this way, it is possible to ensure that a large quantity of incident light radiation encountering the pattern is trapped by this pattern and, because the depth of the cavities is limited, excessive impairment of the mechanical strength of the sidewall is avoided.

In one preferred embodiment, all or some of the cavities have at least one wall which, when viewed in cross section, forms an angle $\alpha$ of between 10° and 45° with respect to a direction Z perpendicular to the pattern.

Each time a ray of light encounters a wall of the cavity, this ray is reflected by the said wall. The direction in which the ray of light is reflected is dependent on the initial direction of this ray of light and on the angle of inclination of the wall. Thus, according to this initial direction and this angle of inclination, the ray of light may be reflected onto another wall of the cavity. Conversely, the ray of light may be reflected out of the cavity, for example directly to an observer. In the former instance, the ray of light "becomes lost" in the cavity and will no longer be visible to an observer. In the latter instance, the observer can see the ray of light and the pattern may therefore seem lighter and therefore less strongly contrasted against the sidewall. By choosing a cavity that has at least one wall that forms an angle $\alpha$ of between 10° and 45° it is possible to ensure that a large proportion of the rays of light entering the cavity will be absorbed by this cavity under the effect of multiple reflections within the cavity. In this way, the contrast of the pattern against the sidewall is improved while at the same time maintaining the same proportion of cavities in this pattern. Furthermore, with this wall inclination, the strength of the pattern is improved overall, notably with regard to repeated rubbing against a pavement.

Another subject of the invention is a mold for molding and vulcanizing a tire. This mold comprises a mold element for molding a sidewall of this tire and a marking formed on this mold element. This marking comprises a plurality of protuberances projecting from the mould element and intermediate parts of the mold element separating the protuberances. The protuberances occupy at least 60% of the marking. These protuberances are distributed through the marking at a density at least equal to five protuberances per square millimeter ($mm^2$).

These protuberances respectively comprise bases in contact with the mold element, these bases having equivalent diameters of between 0.03 mm and 0.5 mm.

Another subject of the invention relates to a method for producing a pattern that contrasts against a sidewall of a tire. This method comprises, following the vulcanizing of this tire, a step of using a laser beam to create on the sidewall of the tire a pattern comprising a plurality of openings and intermediate zones separating these openings. The openings occupy at least 60% of the pattern. In addition, the openings are distributed through the pattern at a density at least equal to five openings per square millimeter ($mm^2$) and they have equivalent diameters of between 0.03 mm and 0.5 mm.

With such a method it is possible to create a robust pattern that contrasts against a sidewall of a tire and to do so after this tire has been vulcanized. That notably allows for a greater degree of customization of the tire without the need to offer new mould elements suited to this pattern, which elements are always expensive to manufacture.

BRIEF DESCRIPTION OF THE DRAWINGS

Further features and advantages of embodiments of the invention will become apparent from the following description given by way of nonlimiting example with reference to the attached drawings in which.

DETAILED DESCRIPTION OF SPECIFIC EMBODIMENTS

In the description that follows, elements that are substantially identical or similar will be denoted by identical references.

Figure 1:
FIG. 1 schematically depicts a sidewall of a tire and a pattern contrasting against this sidewall.

FIG. 1 is a partial view of a tire 1 according to an embodiment of the invention. More specifically, FIG. 1 depicts a sidewall 3 of this tire and a pattern 5 formed on this sidewall 3. The sidewall 3 has a surface finish that is smooth overall, giving it a good ability to reflect incident rays of light. Thus, under normal brightness conditions, the sidewall will be perceived by an observer as being shiny overall.

The pattern 5 though has a dark and matt appearance, which contrasts against the sidewall 3.

Figure 2:
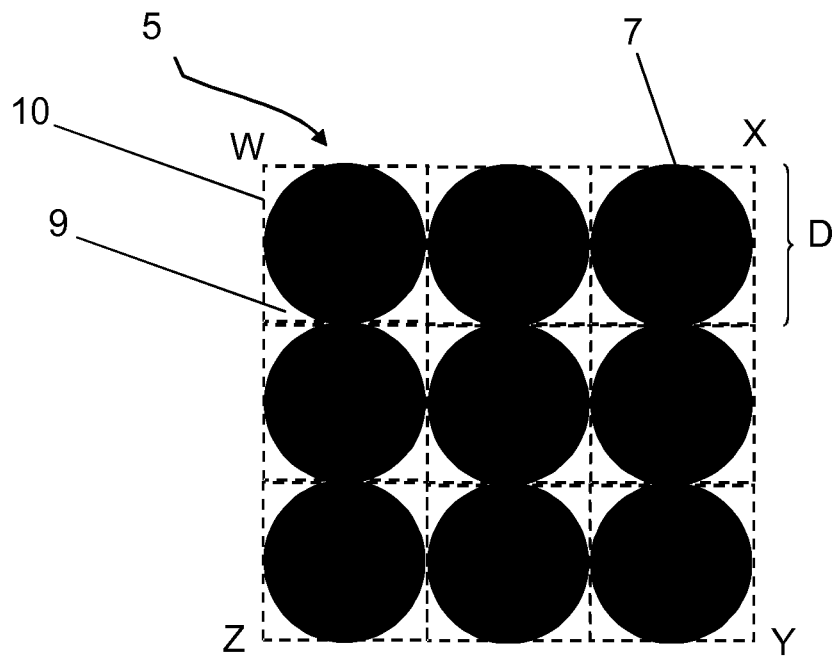
FIG. 2 schematically depicts a first embodiment of the pattern of FIG. 1.

FIG. 2 depicts a first embodiment of the pattern of FIG. 1. In this embodiment, the pattern 5 comprises a plurality of cavities extending into the depth of the sidewall 3. These cavities open onto the sidewall forming circular openings 7 of diameter D. The pattern also comprises intermediate zones 9 separating the openings 7. Each opening 7 can be inscribed inside a square 10 of which the sides (drawn here in dotted line) have the same length as the diameter D of the openings. The segments WX, XY, YZ, ZW which rest against part of the sides of the squares 10 delimit the pattern 5. Here the pattern 5 is square in shape.

It is possible to determine a proportion of openings in the pattern 5. This proportion of openings corresponds to the ratio of the surface area occupied by these openings to the total surface area of the pattern. In the example of FIG. 2, the 9 openings 7 occupy a surface area corresponding to $9\pi \times D^2/4$ and the surface area of the pattern corresponds to $9 \times D^2$. The proportion of openings is therefore equal to $\pi/4$, namely 78.5%.

It will be noted that the openings are distributed through the pattern at a density at least equal to five openings per square millimeter and these openings have diameters of between 0.03 mm and 0.5 mm. Of course, it is possible to select the density of the openings and/or the diameter thereof within these ranges of values in such a way as to achieve the desired proportion of openings, such as a proportion greater than or equal to 60%, 70%, 80%, 90% or even 95%.

It will also be noted that the openings 7 here touch so as to minimise the surface of sidewall present between the openings.

Figure 3:
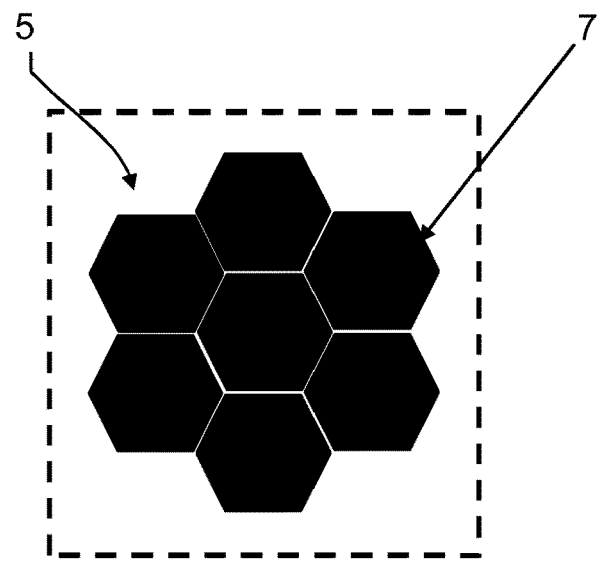
FIG. 3 schematically depicts a second embodiment of the pattern of FIG. 1.

FIG. 3 depicts a second alternative form of embodiment of the pattern 5 in which the openings 7 are of polygonal shape. More specifically, the openings here form hexagons.

With such a shape of opening it is possible more easily to organise the openings relative to one another with a view to reducing the surface of intermediate zones between the openings. It is thus more easily possible to achieve high proportions of openings in the pattern.

Figure 4:
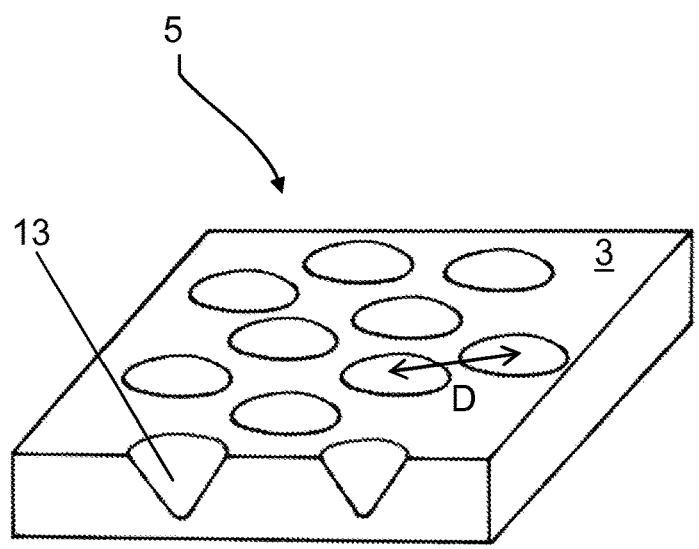
FIG. 4 schematically depicts a view in cross section of the pattern of FIG. 1 according to a third embodiment.

FIG. 4 depicts a view in partial section of a pattern according to a third embodiment. In this alternative form, the cavities 13 form a cone frustum in the depth of the sidewall 3. In this way, the contrast of the pattern against the sidewall is improved. It will be noted that, in this embodiment, the openings 7 of the cavities 13 do not touch. Further, the openings are evenly distributed over the sidewall in such a way that the distance D between each opening 7 of the pattern 5 is the same.

Figure 5:
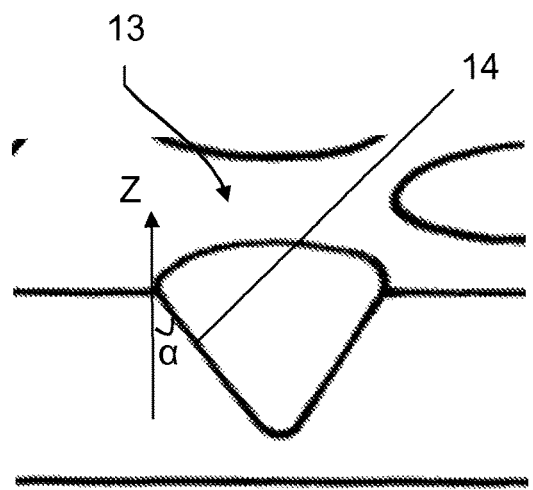
FIG. 5 depicts an enlarged view of a cavity of FIG. 4.

FIG. 5 depicts an enlargement of the cavity 13 of FIG. 4. In this figure, the cavity has walls 14. Each wall forms an angle α of between 10° and 45° with respect to a direction Z perpendicular to the pattern. With such a configuration the absorption of incident rays of light by the cavity is improved.

It will also be noted that the cavities of the pattern have a depth at least equal to 0.1 mm. For preference, the depth of the cavities is greater than or equal to 0.2 mm and less than or equal to 0.6 mm.

Figure 6:
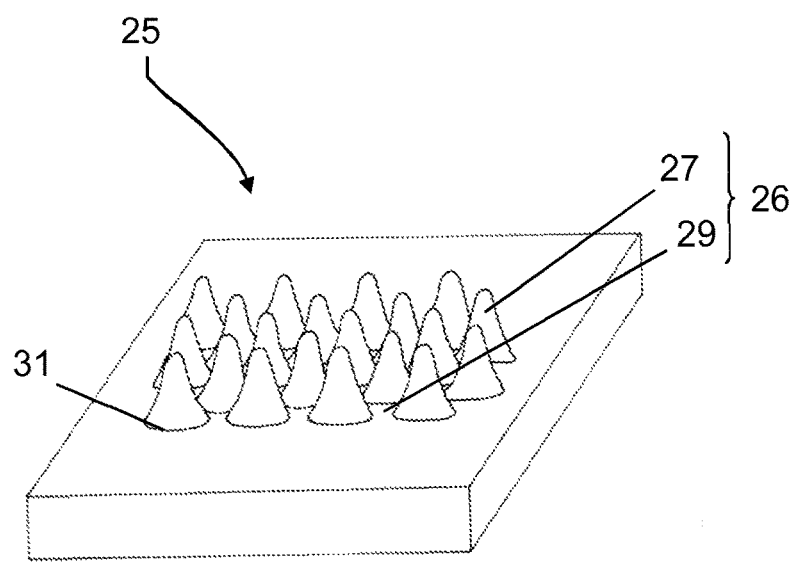
FIG. 6 schematically depicts a perspective view of part of a mold able to mould the pattern of FIG. 4.

FIG. 6 shows a mold element 25 and a marking 26 formed on this mould element. This marking is able to mould the pattern of FIG. 4. This marking comprises a plurality of protuberances 27 projecting from the mold element 25 and intermediate parts 29 separating the protuberances 27. The protuberances 27 are distributed through the pattern at a density at least equal to five protuberances per square millimeter, and these protuberances have bases 31 in contact with the mold element. Each base here has a circular overall shape having a diameter of between 0.03 mm and 0.5 mm. The density of the protuberances and/or the diameter of their base is/are therefore selected within these ranges of values so that the protuberances occupy at least 60% of the marking. In preferred embodiments, the protuberances occupy at least 70%, 80%, 90% or even 95% of the marking.

Figure 7:
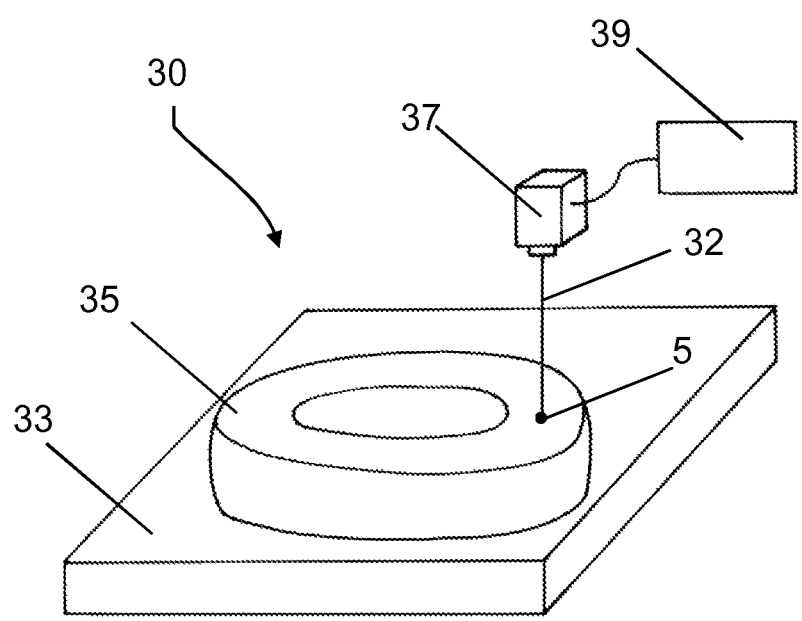
FIG. 7 schematically depicts a device for producing the pattern of FIG. 4 on the sidewall of the tire of FIG. 1 after the vulcanizing of this tire.

FIG. 7 shows a device 30 for creating a pattern 5 on a tire sidewall. This device comprises a plateau 33 intended to accept a tire 35, laser means 37 able to engrave the marking on the tire using a laser beam 32 and means 39 of controlling these laser means. By way of explanation, the laser means comprise a pulsed laser of the IPG make, having a power of 50 W.

The device 30 allows the implementation of a method for creating a pattern that contrasts against the sidewall of the tire. A first step in this method comprises placing the tire on the plateau 33. The laser means 37 are then positioned with respect to this tire and the pattern is engraved on the sidewall. More specifically, the laser means form a plurality of cavities in the depth of the sidewall. Because of the method used, these cavities open onto the exterior surface of the sidewall facing the laser means and form openings. These openings are separated by non-engraved intermediate zones. The openings have a density at least equal to five openings per square millimeter (mm²) and have equivalent diameters of between 0.03 mm and 0.5 mm. The laser means are configured so that the openings formed by the laser beam occupy at least 60% of the pattern. In preferred embodiments, the openings occupy at least 70%, 80%, 90% or even 95% of the pattern.

The invention is not restricted to the examples described and depicted and various modifications can be made thereto without departing from its scope.

The invention claimed is:

1. A tire made of rubbery material comprising a sidewall and a pattern displaying legal, technical and/or product origin information formed on this sidewall, this pattern comprising:

a plurality of openings, and intermediate zones separating the openings, wherein in order for the pattern of the openings to contrast with the sidewall and to visually display the legal, technical and/or product origin information, the openings occupy at least 60% of the pattern, wherein the openings are distributed through the pattern at a density at least equal to five openings per square millimeter (mm²), wherein the openings are conically shaped, each opening having a side wall with a maximum diameter of between 0.03 mm and 0.5 mm and wherein the diameter decreases continuously to a maximum depth of the opening, the maximum depth of the opening being between 0.2 mm and 0.6 mm, and wherein each side wall extends at an angle which is between 10° and 45° relative to a direction which is perpendicular to the side wall of the tire for optimizing the amount of light that is absorbed within the opening.

2. The tire according to claim 1, wherein the openings occupy at least 70% of the pattern.

3. The tire according to claim 2, wherein the openings occupy at least 80% of the pattern.

4. The tire according to claim 3, wherein the openings occupy at least 90% of the pattern.

5. The tire according to claim 4, wherein the openings occupy at least 95% of the pattern.

* * * * *